United States Patent
Vogt et al.

(10) Patent No.: US 12,055,235 B2
(45) Date of Patent: Aug. 6, 2024

(54) SOLENOID VALVE AND METHOD OF ADJUSTING OF A MAGNETIC DRIVE FOR A SOLENOID VALVE

(71) Applicant: Festo SE & Co. KG, Esslingen (DE)

(72) Inventors: Bernhard Vogt, Tübingen (DE); Stefan Schietinger, Esslingen (DE); Sascho Zadravec, Göppingen (DE); Lukas Grad, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 21 days.

(21) Appl. No.: 17/666,004

(22) Filed: Feb. 7, 2022

(65) Prior Publication Data

US 2022/0252178 A1    Aug. 11, 2022

(30) Foreign Application Priority Data

Feb. 8, 2021   (DE) .......................... 102021201140.3

(51) Int. Cl.
*F16K 31/10*   (2006.01)
*F16K 7/16*    (2006.01)
*F16K 31/06*   (2006.01)

(52) U.S. Cl.
CPC ................ *F16K 31/10* (2013.01); *F16K 7/16* (2013.01); *F16K 31/0655* (2013.01); *F16K 31/0675* (2013.01); *F16K 31/0603* (2013.01)

(58) Field of Classification Search
CPC . F16K 1/523; F16K 5/12; F16K 5/163; F16K 31/10; F16K 31/0655; F16K 31/0675; F16K 31/0603; F16K 7/16
See application file for complete search history.

(56) References Cited

U.S. PATENT DOCUMENTS

| 5,337,785 | A  | * | 8/1994  | Romer    | F16K 31/10   |
|           |    |   |         |          | 251/30.05    |
| 6,318,408 | B1 | * | 11/2001 | Fukano   | F15B 13/044  |
|           |    |   |         |          | 137/625.65   |
| 6,726,173 | B2 | * | 4/2004  | Hettinger | F16K 31/0641 |
|           |    |   |         |          | 251/129.2    |

(Continued)

FOREIGN PATENT DOCUMENTS

| DE | 68908036 | 11/1993 |
| DE | 60017310 | 3/2006  |

*Primary Examiner* — Matthew W Jellett
(74) *Attorney, Agent, or Firm* — Hoffmann & Baron, LLP

(57) ABSTRACT

A solenoid valve having a valve housing in which a flexible diaphragm is accommodated, having a rocker for deforming the diaphragm, wherein a first orifice of a first fluid channel serves as a first valve seat against which the diaphragm is pressed in a sealing manner in the first functional position of the rocker and which valve seat is released by the diaphragm in the second functional position of the rocker, and further comprising a magnetic drive for moving a linearly movable armature part which is provided with an intermediate part for transmitting force to the rocker and which passes through the intermediate part, wherein the intermediate part is connected to the end region in a force-locking and/or substance-locking manner and/or is supported in a form-locking manner on an annular collar of a retaining part fixed to the end region in a force-locking or substance-locking manner.

5 Claims, 3 Drawing Sheets

(56) References Cited

U.S. PATENT DOCUMENTS

| | | | |
|---|---|---|---|
| 6,752,375 B2* | 6/2004 | Fukano | F16K 31/06 |
| | | | 251/129.17 |
| 8,480,383 B2* | 7/2013 | Fukano | F04B 35/045 |
| | | | 417/413.1 |
| 8,752,584 B2* | 6/2014 | Grandvallet | F16K 31/10 |
| | | | 137/553 |
| 10,221,957 B2* | 3/2019 | Ohta | F16K 11/04 |
| 10,830,371 B2* | 11/2020 | Raff | F16K 31/0606 |
| 11,118,702 B2* | 9/2021 | Egner | F16K 31/0675 |
| 2019/0353272 A1* | 11/2019 | Grandvallet | F16K 11/022 |

* cited by examiner

SOLENOID VALVE AND METHOD OF ADJUSTING OF A MAGNETIC DRIVE FOR A SOLENOID VALVE

BACKGROUND OF THE INVENTION

The invention relates to a solenoid valve and a method for adjusting a magnetic drive for a solenoid valve.

SUMMARY OF THE INVENTION

The task of the invention is to provide a solenoid valve and a method for adjusting a magnetic drive for a solenoid valve, with which tolerance requirements for components of the magnetic drive can be brought to a favourable cost level.

This task is solved for a solenoid valve, which is designed to influence a fluid flow, with the following features. In this case, the solenoid valve comprises a valve housing which delimits a working space which is separated by a flexible diaphragm into a fluid region and an actuating region, and in which a rocker is arranged which is accommodated in the actuating region such that it can pivot between a first functional position and a second functional position, wherein a first fluid channel and a second fluid channel are extended between an outer surface of the valve housing and the fluid region, and a first mouth opening of the first fluid channel is formed as a first valve seat against which the diaphragm is sealingly pressed in the first functional position of the rocker and which is released by the diaphragm in the second functional position. Furthermore, the solenoid valve comprises a magnetic drive which has a yoke of frame-shaped design, a solenoid coil arranged in the yoke, and a first armature part which is connected at the end to the yoke and is accommodated in a coil recess of the solenoid coil, and a second armature part which is accommodated in the coil recess such that it can move linearly, is arranged in series with the first armature part along a coil axis of the solenoid coil, and projects beyond the yoke with an end region facing away from the first armature part, as well as an intermediate part which is designed for a force transmission between the second armature part and the rocker and which is associated with the end region of the second armature part, wherein the end region is non-positively and/or materially connected to the intermediate part and/or wherein the intermediate part is positively supported on an annular collar, which extends transversely to the coil axis, of a holding part which is non-positively or materially fixed to the end region.

The solenoid valve is a media-separated valve intended for use in the metering of liquids, particularly in the field of laboratory technology. A fluid-tight separation between the fluid area and the actuating area is effected by the diaphragm arranged in the working chamber. The task of the rocker is to convert an actuating movement provided by the magnetic drive into a pivoting movement, with the aid of which a release or a sealing closure of at least a first valve seat can be effected by the diaphragm. In this way, the desired influence on a fluid flow is achieved, the fluid flow being provided, for example, at an inlet connection of the first fluid channel and exiting at the first valve seat after flowing through the first fluid channel, provided that this first fluid channel is released by the diaphragm in the corresponding functional position of the rocker and the fluid can flow off through the second fluid channel after flowing through the fluid region.

In order to be able to manufacture such a solenoid valve in a compact design with sufficient performance at a favourable cost, it is advantageous if a stroke which the second armature part performs along the coil axis relative to the first armature part as a function of a current applied to the solenoid coil has a small amount, i.e. a movement for the second armature part is sufficient to ensure reliable actuation of the rocker for closing and releasing at least the first valve seat with the diaphragm. In order to ensure a reliable sealing of the first valve seat in the first functional position of the rocker as well as a complete release of the first valve seat in the second functional position of the rocker, a precise conversion of the linear movement of the second armature part into the pivoting movement of the rocker must be ensured under the condition that a small stroke is desired for the second armature part in order to be able to use a compact and cost-effective magnetic drive. In order to minimize the use of components that must be manufactured to tight and therefore costly tolerances, the solenoid valve is designed to adjust the position of the intermediate part along the coil axis relative to the second armature part. In this way, a large number of tolerances which would otherwise have to be taken into account in positioning the intermediate part relative to the rocker can be eliminated. In order to be able to perform this adjustment, an adjustability for the positioning of the intermediate part relative to the second armature part is to be provided. Such adjustability can be realized by the intermediate part being received on the end region of the second armature part in a force-locking or material-locking manner Preferably, it is provided that the end region of the second armature part is at least partially immersed in the intermediate part provided with a blind hole or a through hole. It may also be provided that the end region of the second armature part penetrates the intermediate part, which is provided with a hole, in particular with a through hole, and the second armature part possibly projects at least slightly in the axial direction beyond the intermediate part.

For a force-locking connection between the intermediate part and the end region of the second armature part, it is to be provided that an inner surface of a recess formed in the intermediate part, in which the end region of the second armature part engages, has one or more contact surfaces which bear against the end region of the second armature part and which are arranged with respect to one another in such a way that a cross section determined by them is slightly smaller than a cross section of bearing surfaces on an outer surface of the end region of the second armature part, against which these contact surfaces bear. In the case of a force-fit coupling between the end region of the second armature part and the intermediate part, the intermediate part is pressed onto the end region of the second armature part along the coil axis using a suitable adjusting device until a predeterminable reference dimension is reached, which is the position of the intermediate part relative to a reference surface formed on the magnetic drive, for example an end surface of the yoke.

Supplementary or alternatively, it can be provided that the intermediate part is fixed to the end region of the second armature part in a materially locking manner at the end of the execution of the adjustment process, for example by connection processes such as bonding, soldering, welding.

In an alternative embodiment of the connection between the end region of the second armature part and the intermediate part, it is provided that the intermediate part bears positively in the axial direction against an annular collar of a retaining part and that the retaining part is applied to the end region of the second armature part along the coil axis when the adjustment process is carried out in such a way that the desired reference dimension is achieved. Fixation of the retaining part to the end region of the second armature part can be provided in a force-locking and/or substance-locking manner.

Advantageous further embodiments of the invention are the subject of the subclaims.

It is expedient if the retaining part is annular and is pushed onto an outer circumferential surface of the end region. Preferably, an end face of the retaining part facing away from the yoke and formed as a flat annular surface has a greater distance from the yoke than an end face of the end region. In this case, the annular surface of the retaining part serves as one of two reference surfaces between which a distance is determined in order to be able to determine the precise positioning of the retaining part and thus also of the intermediate part at the end region of the second armature part. It is particularly preferred that the second armature part and the retaining part are matched to each other in such a way that the annular surface is always at a greater distance from the yoke than an end face of the end region, even when tolerances are taken into account, since this enables the end face of the retaining part to be advantageously supported on a flat supporting surface while the adjustment process is being carried out. Otherwise, the support surface must be provided with a recess into which the end portion of the second armature part can dip during the performance of the adjustment operation while the annular surface rests on the support surface.

Alternatively, it is provided that the retaining part comprises a cylindrically, in particular circular-cylindrically, designed retaining section which is partially inserted into a recess extending along the coil axis of the end region and further comprises a cylindrically, in particular circular-cylindrically, designed supporting section facing away from the yoke. In this alternative design of the retaining part, it is to be ensured by suitable dimensioning of the second armature part and the retaining part that a distance between an end face of the supporting portion facing the yoke and the yoke is always greater than a distance between the end face of the end region and the yoke.

In a further embodiment of the invention, it is provided that a first actuating projection, in particular of hemispherical design, projects from an end face of the intermediate part, which end face faces away from the yoke, and that a second actuating projection, in particular of hemispherical design, is formed on a supporting plunger, which supporting plunger is accommodated in a recess of the intermediate part such that it can move linearly, and likewise projects from the end face of the intermediate part. The task of the first actuating projection and the second actuating projection is to transmit motion in a defined manner from the intermediate part to the rocker. In particular, it is provided that a first contact surface and a second contact surface, which are formed on a surface of the rocker facing the intermediate part and against which the first actuating projection and the second actuating projection respectively bear, are arranged in such a way that the rocker releases the first valve seat in a first switching position of the second armature part and seals the first valve seat with the diaphragm in a second switching position of the second armature part. Exemplarily, it is provided that the first switching position for the second armature part is caused by energizing the solenoid coil, whereby a magnetic flux occurs in the solenoid coil, in the yoke as well as in the first armature part and an air gap between the first armature part and the second armature part, which is also referred to as the working gap, is minimal or disappears. Furthermore, it can be exemplarily provided that the second switching position for the second armature part is achieved when the energization of the solenoid coil at least almost disappears or is completely switched off and the second armature part together with the intermediate part is brought, for example by the action of a suitable spring, into a position along the coil axis in which the air gap or working gap has a maximum extent.

It is further provided that the second actuating projection is formed on a supporting plunger received in the intermediate part so as to be linearly movable. The function of the support plunger is to enable displacement of the second actuating projection as a function of a position of the second armature part along the coil axis. Preferably, it is provided that the support plunger is held in a preferred position relative to the intermediate part by a spring and is deflected from this preferred position when a displacement of the second armature part occurs due to a change of energization for the solenoid coil. By way of example, it is provided that a spring, which is designed to define a preferred position for the intermediate part along the coil axis, and a further spring, which is assigned to the support plunger, are matched to one another in such a way that, as a result of the interaction of the first actuating projection with the rocker in the second functional position of the second armature part, the intermediate part causes the rocker to be deflected into the second functional position and thus releases the first valve seat. It is further provided that in the first functional position of the second armature part, in which the air gap or working gap with respect to the first armature part is minimal, in particular disappears, the second actuating projection brings the rocker into the first functional position due to the spring action of the spring associated with the support plunger, thereby causing the sealing contact of the diaphragm with the first valve seat.

In a further embodiment of the invention, it is provided that in a recess in the intermediate part, which recess is formed to receive the end portion of the second armature part or to receive the retaining part, there is formed at least one projection extending along the coil axis and directed radially inwardly, which reduces a cross-section of the recess by less than 5 percent, preferably by less than 2 percent, and by at least 0.5 percent. This is based on the consideration that a cross-section of the end region of the second armature part and a cross-section of the recess in the intermediate part are identical and the desired frictional coupling between the second armature part and the intermediate part is ensured by the at least one radially inwardly projecting projection. Depending on the material pairing (metal/metal; metal/plastic) between the second armature part and the intermediate part, the at least one projection is elastically and possibly also plastically deformed or may be at least partially removed when the intermediate part is pushed onto the end region of the second armature part.

It is advantageous if the magnetic drive rests on a bearing surface of the valve housing with an end face of the yoke penetrated by the end region of the second armature part. In this case, the end face of the yoke, which is designed as an outer surface, serves as a reference surface both with regard to adjusting the position of the intermediate part at the end region of the second armature part and with regard to the position of the rocker, which is accommodated pivotably in the valve housing. By way of example, it can be provided that the support of the valve housing and a bearing bore in the valve housing, which is designed to receive an axle for the rocker, have a distance within a narrow tolerance band due to a suitable manufacturing method or suitable machining of the valve housing, in order to ensure precise actuation by the intermediate part adjusted with respect to the end face of the yoke.

In this connection, it is advantageous if the valve housing comprises a valve housing upper part and a valve housing lower part, the diaphragm being arranged in a sealing manner between the valve housing upper part and the valve housing lower part, and a bearing bore being formed in the valve housing upper part, which bearing bore is aligned transversely with respect to the coil longitudinal axis and is designed to receive a hinge pin of the rocker.

The task of the invention is solved by a method for adjusting a magnetic drive for a solenoid valve, comprising the following steps: Providing a solenoid coil which is accommodated in a yoke formed in the shape of a frame, a first armature part connected to the end of the yoke being accommodated in a coil recess of the solenoid coil, inserting a second armature part into the coil recess so that mutually opposite end faces of the first armature part and the second armature part are in contact with one another, placing an intermediate part on an end region of the second armature part, which end region faces away from the first armature part, fixing the intermediate part to the end region after setting a reference distance between a reference surface associated with the intermediate part and a reference surface formed on the yoke.

In a further embodiment of the method, it is provided that the reference distance is determined starting from a reference surface formed on the intermediate part with respect to the reference surface formed on the yoke.

In a further embodiment of the method, it is provided that the reference distance is determined starting from an end face of a retaining part, which is fastened to the end region for fixing the intermediate part, with respect to the reference face formed on the yoke.

BRIEF DESCRIPTION OF THE DRAWINGS

Advantageous embodiments of the invention are shown in the drawing. Here shows.

DETAILED DESCRIPTION

Figure 1:
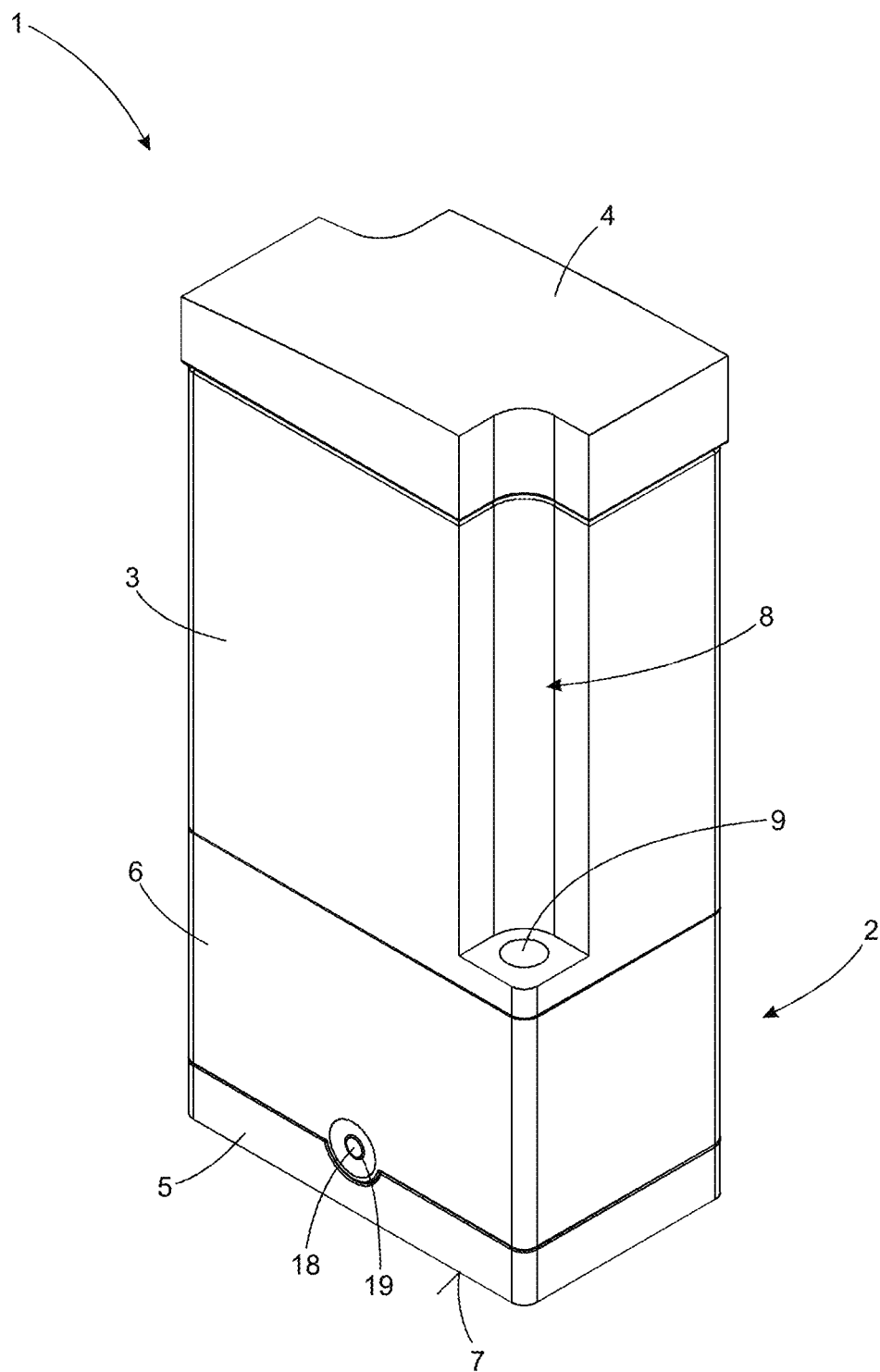
FIG. 1 a perspective view of an external view of a solenoid valve.

A solenoid valve 1 shown in perspective view in FIG. 1 has a substantially cuboidal design and is provided, for example, for use in a metering device (not shown), with which liquid media can be metered. Exemplarily, it is provided that the solenoid valve 1 is divided into a valve housing 2, a drive housing 3, and a control housing 4, which are aligned along a main axis, which is hereinafter also referred to as the coil axis 30.

The valve housing 2 is in turn divided into a valve housing lower part 5 and a valve housing upper part 6. The valve housing lower part 5 has a purely exemplary flat bottom side 7, with which the solenoid valve 1 can be placed on a distributor plate of a metering device, which is penetrated by fluid channels and is not shown. The drive housing 3 is located adjacent to the valve housing upper part 6, wherein the drive housing 3 surrounds the magnetic drive 20 described in more detail below and protects it from environmental influences. Attached to the drive housing 3 is the control housing 4, which accommodates an electronic control (not shown), which may, for example, take the form of a printed circuit with electrical and electronic components applied thereto. An electrical interface (not shown) is provided on the control housing 4, with which, on the one hand, electrical energy for the control device and the magnetic drive 20 can be provided to the solenoid valve 1. Furthermore, the electrical interface (not shown) can also be used for a communication between a higher-level controller and the solenoid valve 1 and, if necessary, to provide sensor data or sensor signal levels from the solenoid valve 1 to the higher-level controller.

By way of example, it is provided that the drive housing 3 and the control housing 4 are provided, at least in some areas, with a recess 8 extending along the coil axis 30, which enables a screw (not shown) to be inserted into a bore 9 and thus the drive housing 3 together with the valve housing 2 to be fixed to the distributor plate (not shown) of a metering device. In this case, the drive housing 3, the valve housing upper part 6 as well as the valve housing lower part 5 are pressed onto each other, whereby, if necessary, a sealing effect between the drive housing 3 and the valve housing 2 is supported.

Figure 2:
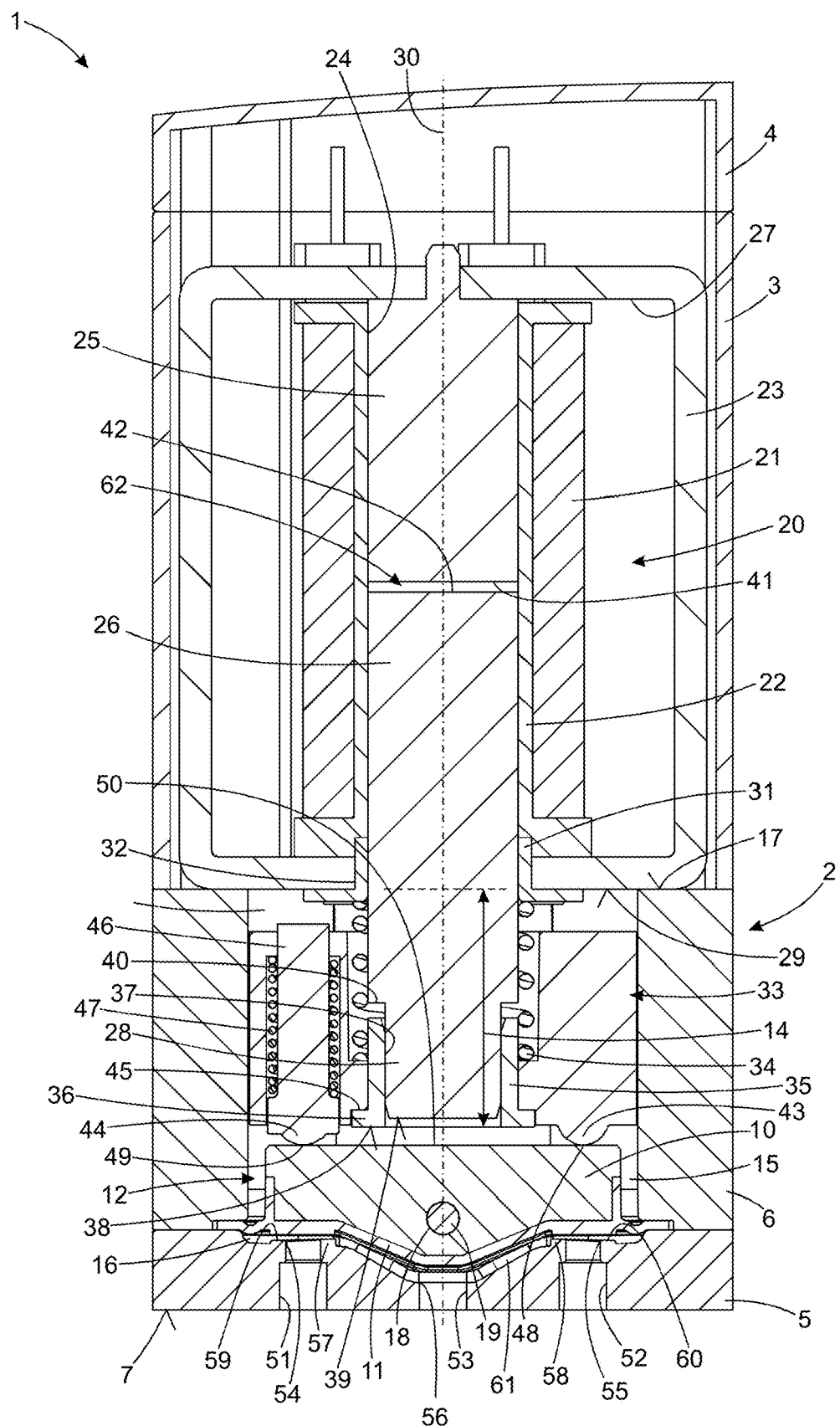
FIG. 2 a planar sectional view of a first embodiment of a solenoid valve with a first embodiment of an end portion of a second armature part with the intermediate part attached thereto, FIG. 3 a sectional view of a second embodiment of an end portion of a second armature part with the intermediate part attached thereto, FIG. 4 a cutaway view of a third embodiment of an end portion of a second armature part with the intermediate part attached thereto, and FIG. 5 a frontal view of the third embodiment according to FIG. 4.

As can be seen from the illustration in FIG. 2, the solenoid valve 1 comprises, in addition to the magnetic drive 20, as further essential components a rocker 10 arranged so as to be pivotable in the valve housing upper part 6 and a diaphragm 11 clamped peripherally between the valve housing lower part 5 and the valve housing upper part 6 in a sealing manner. The diaphragm 11 separates a working chamber 12 bounded by the valve housing lower part 5 and the valve housing upper part 6 into an actuation area 15 and a fluid area 16 and ensures the fluid-tight separation of the actuation area 15 from the fluid area 16.

In a purely exemplary manner, the valve housing lower part 5 has a first fluid duct 51, a second fluid duct 52 and a third fluid duct 53, each of which extends from the underside 7 of the valve housing lower part 5 parallel to the coil axis 30 and opens out into the fluid region 16. Purely by way of example, a first orifice 54 of the first fluid channel 51 and a second orifice 55 of the second fluid channel 52 are each arranged in a first projection 57 and a second projection 58, respectively, of circular cylindrical design, the first end face 59 and the second end face 60 of which are each designed as a valve seat. The rocker 10 and the diaphragm 11 as well as the first end face 59 and the second end face 60 are arranged in such a way that, depending on a pivoted position of the rocker 10, the diaphragm 11 can be brought into sealing connection with the first end face 59, which can also be referred to as the first functional position of the rocker 10, or into sealing connection with the second end face 60, which can also be referred to as the second functional position of the rocker 10, respectively.

The third fluid channel 53 may be disposed centrally between the first fluid channel 51 and the second fluid channel 52. A third orifice 56 of the third fluid channel 53 opens into a recess 61 of the valve housing lower part 5, which recess 61 is such that a fluidically communicating connection between the third fluid channel 53 and the fluid region 16 is always ensured irrespective of the position of the rocker 10 and the deflection of the diaphragm 11 caused thereby. In this regard, the recess 61 also extends around the first protrusion 57 and the second protrusion 58 so that fluid provided by the first fluid channel 51, for example, can flow into the recess 61 and thus into the third fluid channel 53 as soon as the diaphragm 11 is lifted off the end surface 59.

In order to avoid overloading of the diaphragm material during the pivoting movement of the rocker 10 and the resulting deformation of the diaphragm 11, it is provided, purely by way of example, that a pivoting angle for the rocker 10 is less than 10 degrees, preferably less than 5 degrees, between the first functional position and the second functional position, from which it results that a stroke of the magnetic drive 20, which is provided for actuating the rocker 10, is also very small in relation to the dimensioning of the components of the solenoid valve 1.

To provide this stroke, which can also be referred to as the actuating stroke for the rocker 10, the magnetic drive 20 comprises a solenoid coil 21 of purely exemplary circular cylindrical design and comprising a coil body 22. The solenoid coil 21 is accommodated in a yoke 23 of frame-like design, which is made of a magnetic flux-conducting material such as iron. In a circular-cylindrical recess 24 in the coil body 22, which recess extends along the coil axis 30, there is arranged a first armature part 25 which is also circular-cylindrical in shape and is made of magnetic flux-conducting material, for example iron, and which is to connected at the end to an upper inner surface 27 of the yoke 23 and which extends over a partial section of the recess 24 of the coil body 22. In extension of the first armature part 25, a second armature part 26 is received in the recess 24, which, like the first armature part 25, is made of a magnetic flux conducting material, for example iron. In contrast to the first armature part 25, the second armature part 26 is accommodated in the recess 24 so as to be linearly movable along the coil axis 30 and projects with one end region beyond a purely exemplary flat end face 29 of the yoke 23, which is turned downwards according to the representation of FIG. 2. The second armature part 26 is partially slidably guided in the bobbin 22 and passes through a flux guide sleeve 31 which is received in a recess 32 of the yoke 23. The flux guide sleeve 31, which is made of a magnetic flux conducting material, serves on the one hand for slidably guiding the second armature part 26 and on the other hand for magnetic flux coupling of the second armature part 26 to the yoke 23.

An intermediate part 33 is attached to the end portion 28 of the second armature part 26, which intermediate part 33 is formed for transmitting motion between the second armature part 26 and the rocker 10. The intermediate part 33 is pressed in the axial direction against an annular collar 36 of a retaining part 35 by a spring 34, which spring is designed purely exemplarily as a helical spring and is installed under prestress between the intermediate part 33 and an axial end face of the flux guide sleeve 31, assuming an axially positive connection between the intermediate part 33 and the annular collar 36. In purely exemplary fashion, a section of the retaining part 35 is of sleeve-shaped design and is non-positively fixed to an end section 37 of the end region 28. Thereby, an extension of the retaining part 35 and an extension of the end portion 37 of the end region 28 along the coil axis 30 are selected such that even when an annular end face 38 of the retaining part 35 is arranged in a common plane with a circular end face 39 of the end portion 37, the retaining part 35 does not abut a transition region 40 between the smaller diameter of the end portion 37 and the larger diameter of the remaining second armature part 26.

In this case, the annular end surface 38 serves as a reference surface which is brought to a predefined distance from the end surface 29 of the yoke 23 when the position of the intermediate part 33 is adjusted, this adjustment being made when a second end surface 42 of the second armature part 26 abuts against a first end surface 41 of the first armature part 25, thereby causing an air gap or working gap 62 between the first armature part 25 and the second armature part 26 to disappear. By this adjustment of the distance between the end face 38 and the end face 29, an axial position of a first actuating projection 43 projecting on the intermediate part 33 in the direction of the rocker 10 is precisely positioned with respect to the end face 29 of the yoke 23 with a small number of tolerances to be taken into account. The only effective tolerances to be considered are the thickness tolerance for the thickness of the annular collar 36, and the distance tolerance between an annular surface 45 of the intermediate part 33 resting on the annular collar 36 and the actuating projection 43. The actuating projection 43 rests at a first contact point 48 on an actuating surface 50 of the rocker 10, which is flat in purely exemplary fashion, and enables a force to be applied to the rocker 10.

The second actuating projection 44, which is likewise required for actuating the rocker 10, is formed on the end face on a supporting plunger 46, which in turn is accommodated in the intermediate part 33 such that it can move linearly and which is supported by a compression spring 47, which is supported on the intermediate part 33, at second contact point 49 on the actuating surface 50 of the rocker 10.

With regard to the representation of the rocker 10 and the diaphragm 11 in FIG. 2, it should be noted for the sake of completeness that the rocker 10 is in a transitional position between the first functional position and the second functional position, so that neither the first orifice 54 nor the second orifice 55 are sealed in this position. In practice, the position of the rocker 10 shown in FIG. 2 occurs when a switchover is made between the first functional position and the second functional position or a switchover is made between the second functional position of the first preferred position, so that the representation of FIG. 2 is to be understood merely as a snapshot.

The end face 29 of the yoke 23, which serves as a reference surface for adjusting the position of the intermediate part 33, rests on a bearing surface 17 of the valve housing upper part 6 facing away from the valve housing lower part 5. Starting from this bearing surface 17, the position of the actuating surface 50 of the rocker 10 depends on a tolerance for a distance dimension between the bearing surface 17 and a center axis of a bearing bore 19, which is designed to receive a rocker bearing pin 18 serving for the pivot bearing of the rocker 10, as well as on a tolerance of the distance dimension between the center axis of the bearing bore 19 and the actuating surface 50 of the rocker 10.

Thus, the tolerance chain to be considered for precise actuation of the rocker 10 by the magnetic drive 20 includes the tolerance for the distance between the actuating projection 43 and the end face 29 of the yoke 23 determined by the adjustment operation, and the tolerances determined by the distance between the supporting surface 17 and the rocker bearing pin 18 and by the distance between the rocker bearing pin 18 and the actuating surface 50 of the rocker 10.

Figure 3:
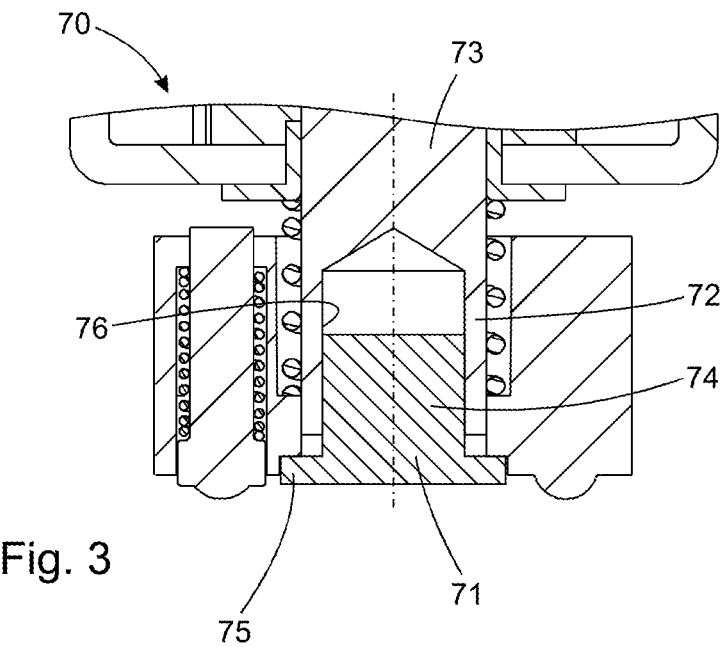

The embodiment of a magnetic drive 70 shown only in detail in FIG. 3 differs from the embodiment of the magnetic drive 20 according to FIG. 2 only with regard to the design of the holding part 71 and with regard to the design of the end region 72 of the second armature part 73. Therefore, only these differently designed components are provided with reference signs. In the embodiment according to FIG. 3, the retaining part 71 is partially formed as a circular-cylindrical pin 74, which is received in a frictionally locking manner in a bore 76 of the second armature part 73. The intermediate part 33 is supported in the axial direction on an annular collar 75 of the retaining part 71 in the same way as in the embodiment of FIG. 2. For an adjustment of the position of the intermediate part 33, it is provided that the retaining part 71 is pressed into the bore 76 with the journal 74 in such a way that the desired distance between the actuating projection 43 and the end face of the yoke 23 is set.

Figure 5:
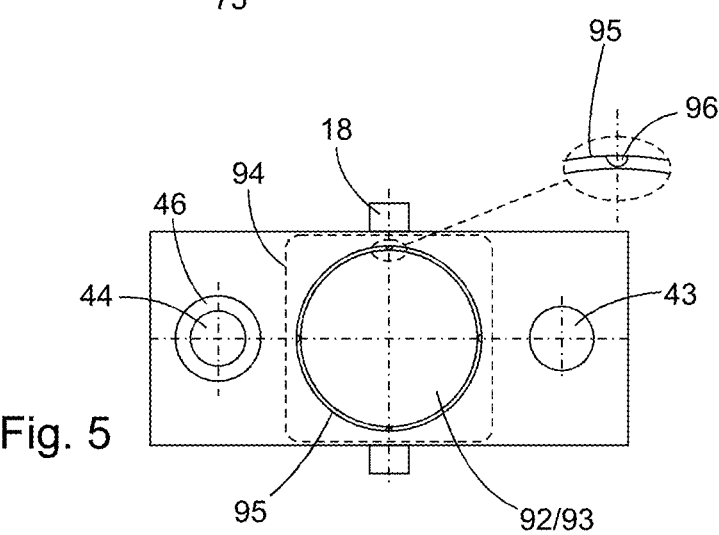
Figure 4:
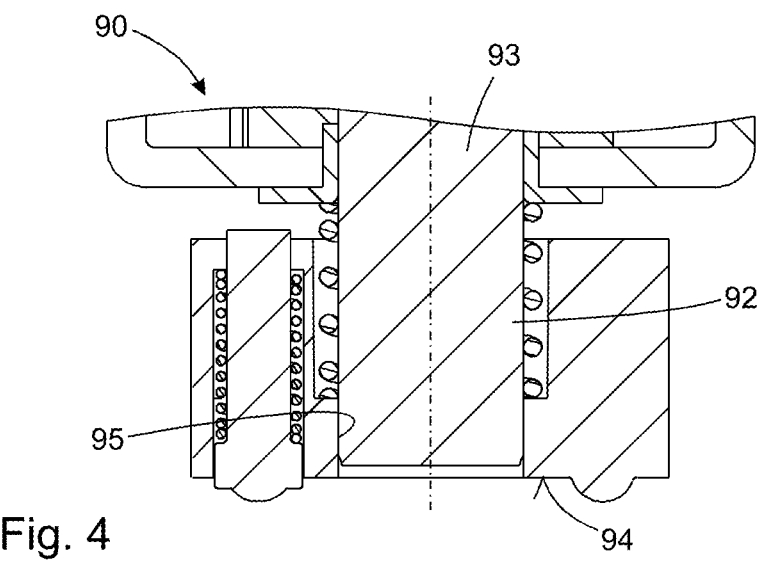

In the embodiment of a magnetic drive 90 according to FIG. 4, in difference from the embodiments of the magnetic drives 20 and 70, direct press mounting of the correspondingly adapted intermediate part 91 onto the end region 92 of the second armature part 93 is provided. Therefore, only these differently designed components are provided with reference signs. For the introduction of pressing forces onto the intermediate part 91, the latter has a pressure surface 94 arranged centrally between the first actuating projection 43 and the second actuating projection 44, as shown purely schematically in dashed representation in FIG. 5. In order to be able to use a wide tolerance window as a basis for manufacturing the intermediate part 91, which is preferably made of a plastic material, it is preferably provided that the recess 95 formed in the intermediate part 91 for receiving the end region 92 of the second armature part 93 is manufactured with a diameter which is slightly larger than the diameter of the end region 92. In order to nevertheless ensure the desired frictional connection between the intermediate part 91 and the end region 92, projections 96 are provided in the recess 95, purely by way of example, which projections 96 are distributed at equal angular pitch over the circumference of the recess 95 and which are directed radially inwards; the projections cause a local cross-sectional narrowing for the recess 95 and thus lead to a local elastic deformation or to a local elastic and plastic deformation of the intermediate part 91 as soon as the intermediate part 91 is pressed onto the end region 92.

What is claimed is:

1. A solenoid valve for influencing a fluid flow, the solenoid valve comprising:
a valve housing which defines a working space which is separated by a flexible diaphragm into a fluid region and an actuation region;
a rocker which is received in the actuation region, the rocker being pivotable between a first functional position and a second functional position;
a first fluid channel and a second fluid channel extending between an outer surface of the valve housing and the fluid region, a first mouth opening of the first fluid channel being formed as a first valve seat, against which the diaphragm is pressed in a sealing manner in the first functional position of the rocker, the first mouth opening being released by the diaphragm in the second functional position of the rocker; and
a magnetic drive, which comprises a frame-shaped yoke and a solenoid coil arranged in the frame-shaped yoke and a first armature part, which is connected at the end to the frame-shaped yoke and which is accommodated in a coil recess of the solenoid coil, the magnetic drive further comprising a second armature part, which is arranged in series with the first armature part along a coil axis of the solenoid coil and projects beyond the frame-shaped yoke with an end region facing away from the first armature part, the magnetic drive further comprising an intermediate part for a force transmission between the second armature part and the rocker, which is connected with the end region of the second armature part, wherein the end region is frictionally and/or materially connected to the intermediate part, or wherein the intermediate part is positively supported on an annular collar, which extends transversely to the coil axis of a retaining part part, which is non-positively or materially fixed to the end region,
wherein the magnetic drive rests on a bearing surface of the valve housing with an end face of the frame-shaped yoke penetrated by the end region of the second armature part, and
wherein the valve housing comprises a valve housing upper part and a valve housing lower part, the diaphragm being arranged in a sealing manner between the valve housing upper part and the valve housing lower part, and wherein a bearing bore which is aligned transversely with respect to the coil longitudinal axis is formed in the valve housing upper part to receive a hinge pin of the rocker, and
wherein the end face of the frame-shaped yoke, which serves as a reference surface for adjusting the position of the intermediate part, rests on a bearing surface of the valve housing upper part facing away from the valve housing lower part.

2. The solenoid valve according to claim 1, wherein the retaining part is annular and is pressed onto an outer circumferential surface of the end region.

3. The solenoid valve according to claim 1, wherein the retaining part comprises a cylindrically shaped retaining section, which is partially inserted into a recess extending along the coil axis of the end region, and comprising a cylindrically shaped supporting section, which faces away from the frame-shaped yoke.

4. The solenoid valve according to claim 1, wherein a first actuating projection projects from an end face of the intermediate part, the end face facing away from the frame-shaped yoke, and wherein a second actuating projection is formed on a supporting plunger which is accommodated in a recess of the intermediate part such that it can move linearly, and likewise projects from the end face of the intermediate part.

5. The solenoid valve according to claim 1, wherein at least one projection is formed in a recess in the intermediate part, the recess being formed to receive the end portion of the second armature part or to receive the retaining part, the at least one projection extending along the coil axis and being oriented radially inwards, the at least one projection reducing a cross-section of the recess by less than 5 percent.

\* \* \* \* \*